United States Patent [19]

Kelley

[11] 4,047,311

[45] Sept. 13, 1977

[54] AUTOMATIC GRAB BUCKET WITH PRESSURE RESPONSIVE SOLENOID CONTROL

[76] Inventor: Charles S. Kelley, 253 Bradwell Road, Barrington, Ill. 60010

[21] Appl. No.: 688,232

[22] Filed: May 20, 1976

Related U.S. Application Data

[63] Continuation-in-part of Ser. No. 508,274, Sept. 23, 1974, Pat. No. 3,967,394.

[51] Int. Cl.² .......................... E02F 5/00; F16D 31/02; B66D 1/48

[52] U.S. Cl. .......................... 37/54; 60/445; 212/42; 37/DIG. 1; 37/DIG. 8; 214/656; 60/DIG. 2; 254/173 R; 214/656

[58] Field of Search .......... 37/54, 71, 183 R, DIG. 1, 37/DIG. 8, 195, 182, 184–188; 212/42; 175/40; 60/445, 905, DIG. 2; 254/172, 173R; 294/110 R

[56] References Cited

U.S. PATENT DOCUMENTS

| | | | |
|---|---|---|---|
| 3,381,939 | 5/1968 | Brown et al. | 254/172 |
| 3,523,614 | 8/1970 | Walker | 37/71 |
| 3,780,990 | 12/1973 | Edlund et al. | 254/173 R |

*Primary Examiner*—E. H. Eickhott
*Attorney, Agent, or Firm*—Watson D. Harbaugh

[57] ABSTRACT

A time saving automatic hydraulic control for that sequence in operations in which a grab excursioning out of sight of the operator, is sequentially lowered open to engage work material, closed to pick up a load, and then hoisted with its load and emptied. A hydraulic-electrical control is activated to stop the lowering of the grab within an adjustable timed period after initial work engagement to provide desirable penetration of the work material by the grab followed by a minimal time for grab closing to accomplish an adjustable constancy of loads as well as positive sequential control for the lowering and hoisting modes.

11 Claims, 7 Drawing Figures

FIG. 3
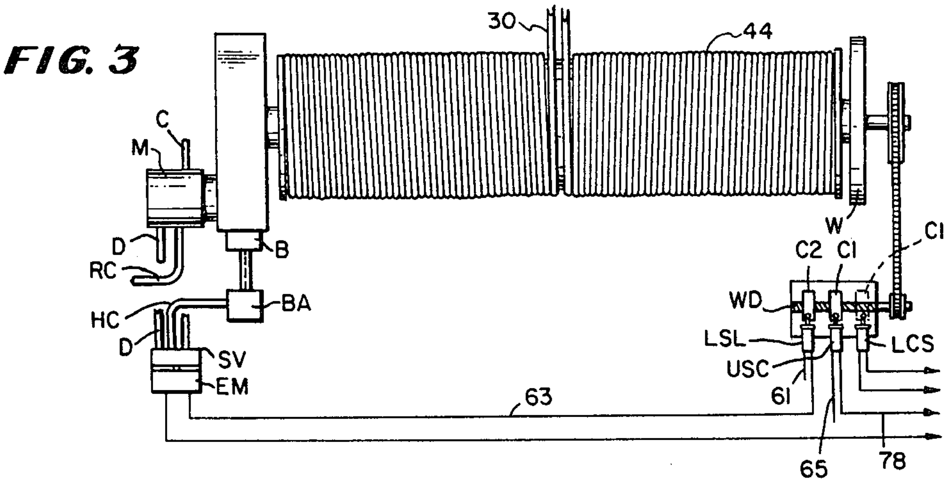
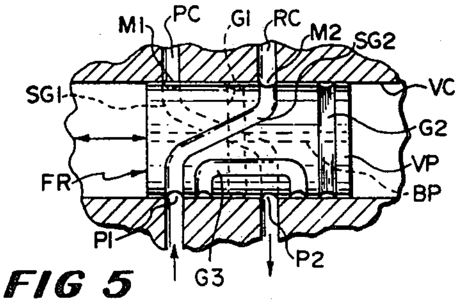
FIG 5
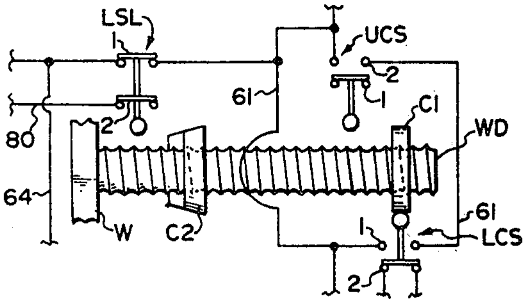
FIG. 6
FIG 7
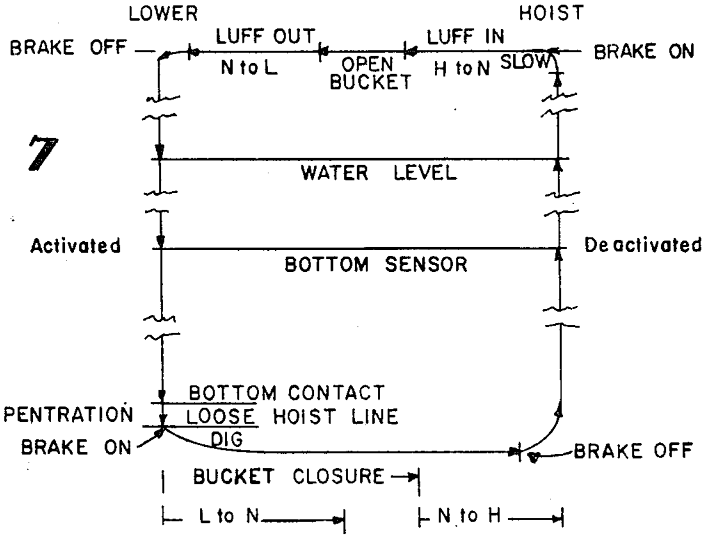

AUTOMATIC GRAB BUCKET WITH PRESSURE RESPONSIVE SOLENOID CONTROL

This application is a continuation-in-part of application Ser. No. 508,274, filed Sept. 23, 1974, now U.S. Pat. No. 3,967,394, by Kelly et al., entitled AUTOMATIC GRAB CRANE.

BACKGROUND OF THE INVENTION

As pointed out in Kelly et al. application Ser. No. 508,274, the operation of a dredge crane operating a grab may be considered having plural sides, such as a two-sided clamshell bucket in underwater dredging. Such involves the sequential steps of lowering, closing, raising, luffing out, opening, luffing in, and again lowering, etc. under changing bottom depths and flowing water. Objectionably, slack hoist lines from poor timing of the braking operation can permit the "burying" of a bucket and incur many kinds of delaying complications including the tilting or tumbling of the bucket, improper closing of the bucket, and, undue stress movements on the hoist.

Accordingly, of the three steps of lowering, closing and raising the bucket, the lowering which includes the braking of the winch is the most critical regarding uniform loading of the bucket and time saving performance, and, all these are the most difficult to program either manually or otherwise, because they occur out of sight of the crane operator. Even if visible through clear water over a range of depths it would be difficult to determine visually when the bucket has established a desirable working position with respect to the bottom and is ready for closing to pick up a load in a single pass without either "burying" the bucket or "skimping" the load.

Full automation for a wide range of changing depths and conditions is highly desirable for these three steps. However, confusing conditions are experienced because in the above sequence two non-contiguous steps occur when the bucket is the lightest on its hoist winch drive, namely, when the winch brake is applied for luffing and opening the bucket, and when the bucket engages the bottom ready for closing. Also, two non-contiguous steps occur when the bucket is the heaviest on the winch drive, namely, when being raised and when being lowered. In both, similarities between the alternative steps provide like conditions that are substantially indistinguishable for automated partial automation. Additionally, two power efforts are involved and their coordination and control have to be transmitted to the bucket through separate connections additionally carried by the boom. One effort is to open and close the bucket, and the other effort is to raise and lower the bucket. Heretofore, these efforts have generally been controlled separately and manually with a substantial waste of operational time and power. Accordingly, time and labor saving operative automation has heretofore been limited.

In the Kelley et al application mentioned, electrical controls are used activated by pressure changes in the high pressure hydraulic connection between the pump and winch motor as related to pressure changes which can occur in either direction of movement.

SUMMARY OF THE INVENTION

In the present invention a hydraulic sensor is employed responsive to a pressure rise from a substantially constant low pressure norm in the low pressure hydraulic connection between the hydraulic winch motor and hydraulic pump as when hydraulic power is used in lowering the clamshell grab bucket. More particularly, the hoist line winch is powered and controlled hydraulically in the lowering mode by a pressure responsive solenoid responding to the reversal of the relative hydraulic pressures in the pump inflow and outflow conduits which occurs when the weight of the lowering grab bucket is removed from the winch motor at the time the bucket engages bottom. In brief, the weight of the bucket no longer overruns the winch motor in lowering mode.

Further objects of the invention include the provision of grab cranes simplified in structure and control and less complicated to maintain and operate. Hydraulic responses are instantly effective because of an assured incompressibility of the liquid involved. Fewer elements are involved with a bottom contact read out which is readily adjustable above the deck of the dredge where they are substantially free from abrasion by the materials handled. Moreover, the elements can operate in an automatic sequential mode continuously subject to immediate manual take-over control when required, or, fail safe at any instant. The bottom sensing means is activated hydraulically and can be adjustably programmed for the grab by the pressure responsive level adjustment to dig to an operational depth at operational speeds that can be adjusted to suit particular work conditions and material handled.

In the drawings:

FIG. 3 is a simplified illustration of the winch and limit switch and brake mechanisms employed therein;

FIG. 5 is a diagrammatic illustration of the flow reversing valve disposed in the lowering mode;

FIG. 6 is an enlarged portion of the circuit illustrated in FIG. 4; and, FIG. 7 is a diagrammatic representation of the essential operational steps occurring in one cycle of bucket operation.

DESCRIPTION OF THE INVENTION

Figure 1:
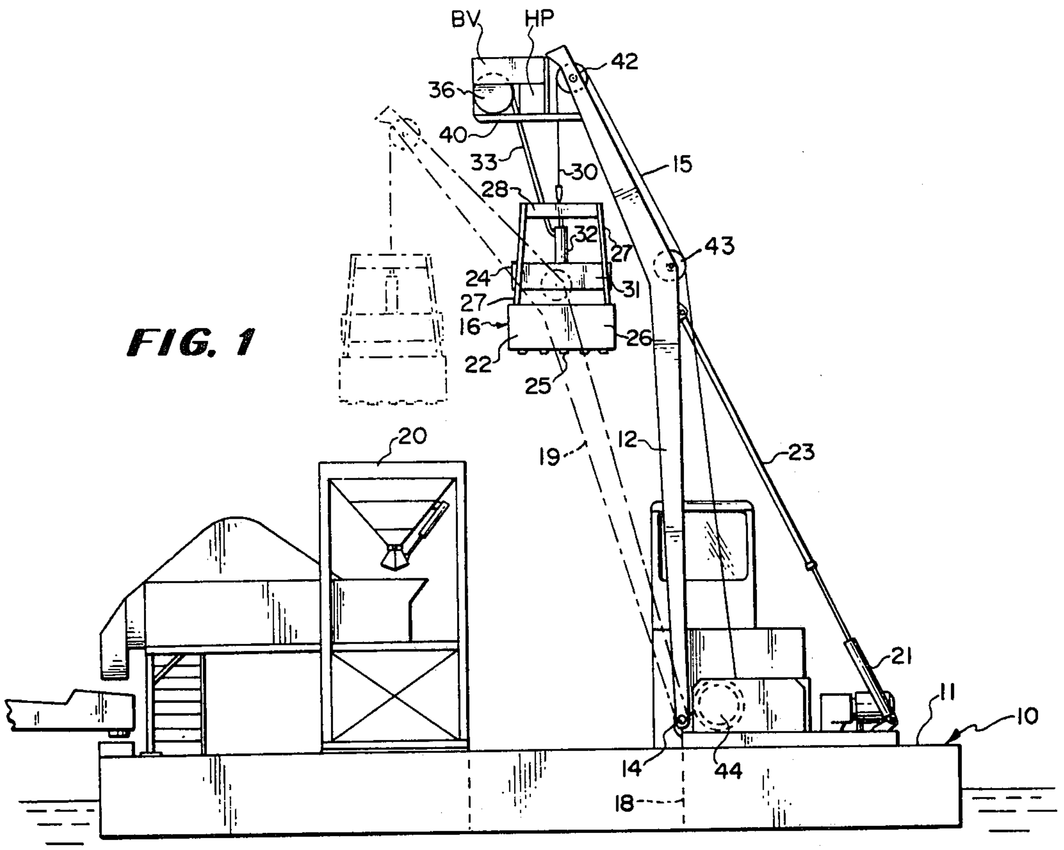
FIG. 1 is a side elevation of a dredge embodying the invention in which the luffing, emptying position is shown in broken lines and the bucket lowering position of the boom is in solid lines. The dredge is in the bucket hoisting mode.
Figure 2:
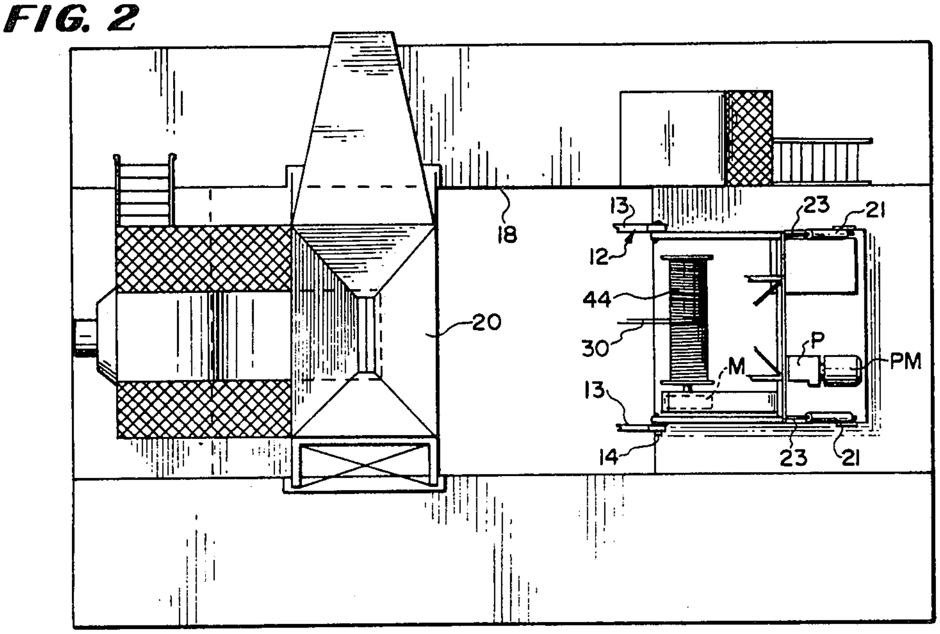
FIG. 2 is a top plan view of the upper part of the boom structure removed to show the relation involving the digging well through which the bucket passes the hull of the dredge barge.

Referring now to the drawings and FIGS. 1 and 2 in further structural detail, a floating dredge 10 is illustrated having an arched shear 12 or "boom" having two legs 13 pivotally mounted at their heels 14 on the deck 11 for movement from its upright position as shown in full lines 15 for hoisting and lowering the clamshell bucket 16 through the digging well 18, to an inclined position shown in broken lines 19 for luffing and opening the bucket to empty its load in the hopper 20. The shear is moved hydraulically between its alternate positions by means of extendible guys 23 that include auxiliary powered hydraulic luffing cylinders 21.

Figure 4:
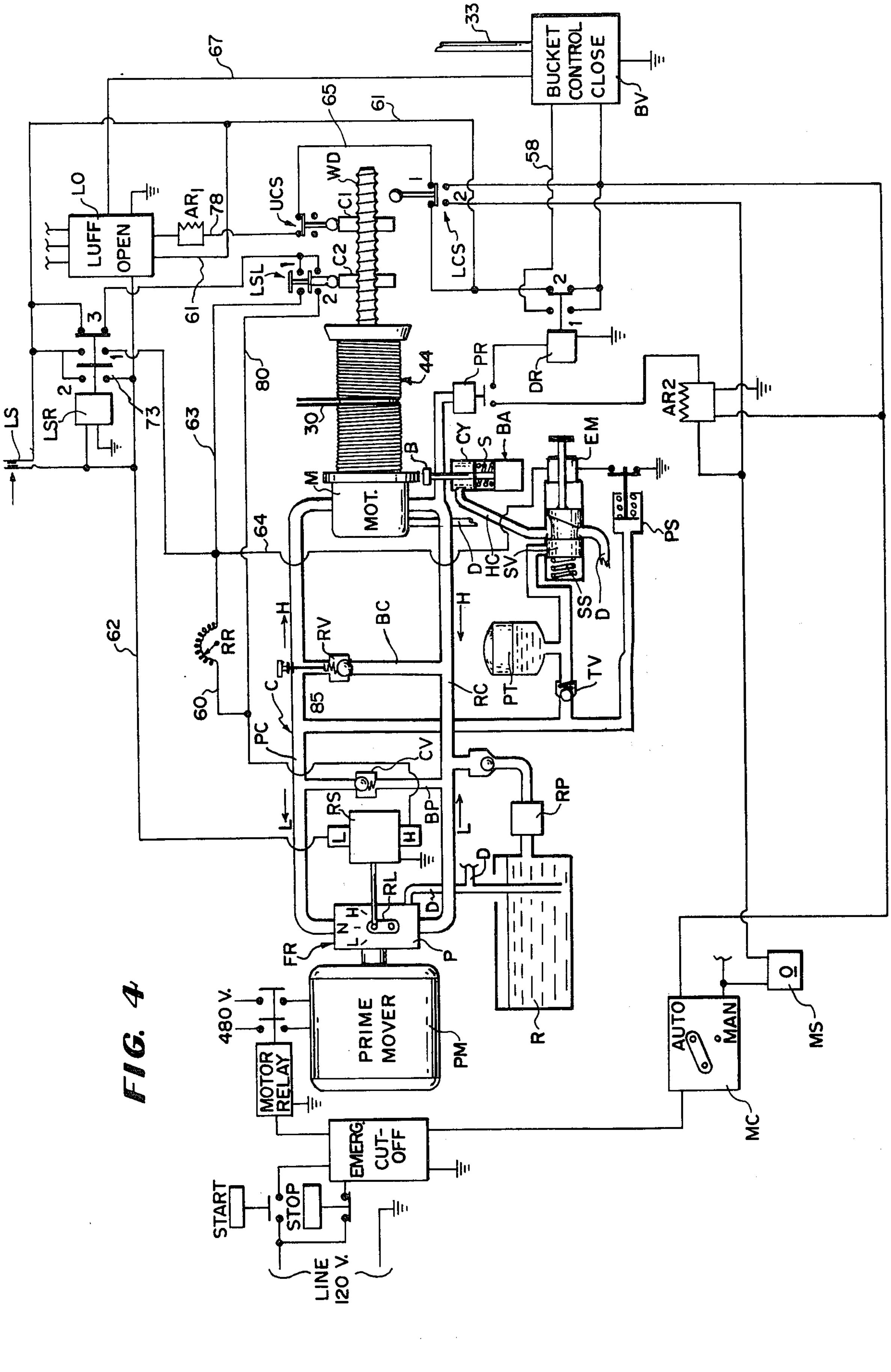
FIG. 4 is a schematic diagram of the electrical and hydraulic controls and the wiring diagram illustrating the invention in a mode preparatory to lowering with brake released ready for starting the bucket lowering mode but with the motor pressure discharge port blocked preventing its rotation.

The clamshell bucket 16, sometimes referred to as a grab bucket, has two semi-circular jaws 22 pivoted to an axle 31 disposed at their radial centers 24, and have toothed lower digging edges 25. At their upper edges 26, or along their upper edges, if underslung, they are pivoted to the lower ends of spreader strut links 27. The upper ends of the links 27 are pivoted on a common axis to a head 28 to which dual hoist lines 30 are attached. Bucket actuating hydraulic cylinders 32 interconnect the axle 31 and head 28 and close the bucket jaws 22 for digging by contraction under hydraulic pressure supplied through the hose 33 by a separate pump HP (FIG. 1) controlled by a solenoid valve BV (FIG. 4). After hoisting the closed bucket 16 for emptying, the relaxation of the hydraulic pressure permits the jaws 22 to open downwardly under their own weight to dump a load. A hose reel 36 carried on a platform 40 at the top of the shear 12 supports the hydraulic hose 33 to pay out and retrieve the hose without slack as the bucket is lowered and raised.

The hoist lines 30 are laid over the head sheaves 42 and guide sheaves 43 on the shear 12 and are wrapped and secured around a hoist winch 44 mounted on the deck 11. The power for the hoist winch hydraulic motor M to raise and lower the bucket is provided preferably by a continuously running positive and variable displacement reversible flow hydraulic pump means P driven by a prime mover PM which may be an electric induction motor as shown when shore power is available, or a speed regulated diesel engine operating at a constant regulated speed.

In the present invention certain pressures may be assumed for explanation purposes in automating a clamshell dredge utilizing hydraulic pressures with controls that distinguish between lowering, bottoming, digging and raising the clamshell bucket in an economical and efficient hydraulic hoist circuit C. The hydraulic circuit C includes the pump P; a flow reversing means FR; the hydraulic motor M; a pressure conduit PC; a return conduit RC; bypass conduits BC and BP connected between conduits PC and RC; a hydraulic supply cooling reservoir R receiving leakage of pump P, motor M, and brake hydraulic pressure release through conduits D; and a pump RP replenishing the circuit C under pressure.

Accordingly, a liquid solid condition is provided without any expandable compressed fluid entrained in it and is maintained in the circuit C by the constant low supply pressure of pump RP, such as 200 to 400 p.s.i.g. This is sometimes referred to as the charge pressure and is effective in both the pressure conduit PC and the return conduit RC. Accordingly, this pressure can be considered as "0", if desired, in some comparisons, since it is a constant. This pressure along with pressure induced by the free weight of the open bucket 16 on the winch motor M when being lowered, may develop a hydraulic pressure of 1,200 p.s.i. in the conduit PC and "0" pressure in the return conduit RC.

The motor M may be assumed to have an internal friction requiring 800 p.s.i. to turn it. After the bucket 16 enters the water, the pressure in conduit PC may drop to 900 p.s.i. due to the effective weight of the bucket being reduced by its buoyancy factor and the inertia of the water resisting its downward movement. The 900 p.s.i. pressure endures without reducing the speed of downward movement of the bucket until the bucket touches bottom to which further consideration is given later. The load lift pressure in conduit PC will be well above 2,000 p.s.i. until the bucket emerges from the water whereupon the maximum lift weight which is higher yet will be experienced when load buoyancy ceases.

As again referred to later, when lowering the bucket 16, the hydraulic flow direction is reversed by the flow reversing means FR and the assumed pressure of 1,200 p.s.i. at the outlet of motor M and intake of the pump P is developed by the weight of the bucket 16 overrunning or driving the pump P. In this mode, the load powers the winch, the winch drives its positive displacement motor M and it in turn acts like a "pump" while the positive displacement pump P rotating at its controlled speed becomes a metering device controlling the lowering speed of the bucket through liquid pressure flow in conduit PC until the bottom is contacted, whereupon a pressure build-up begins in the conduit RC to continue unreeling the winch W, confronted only with overcoming the friction of the motor.

The flow reversing means FR may comprise either a flow-direction reversing valve or qualify as a reversible variable displacement pump. Both would have a normally neutral position (FIG. 5) blocking flow into the conduits PC and RC and alternate positions by which the flow-direction in the circuit C, for hoisting, would be in the direction of arrows H, and when reversed for lowering the flow would be in the direction of arrows L (FIG. 4). A reversed flow mode is shown in FIG. 5. Either means that may be used operates valves with a timed progressive closing and opening action and is controlled by a reversing lever RL controlled by a dual reversing solenoid RS normally having a center-off position for neutral N position and controlling the reversing valve for either fast or slow movement.

In this connection the flow reversing valve FR construction is diagrammatically shown in FIG. 5 where a cylinder having axially and equally spaced opposing pairs of ports $M_1$ and $M_2$ for motor connections and $P_1$ and $P_2$ for the pump connections. A piston VP, having a movement dampening bleed passage BP axially through it, has on opposite sides two surface channel grooves $G_1$ and $G_2$ extending 200° and spaced to coact in one position with the axially spaced pump ports P1 and P2 indicating forward and return flow. On the same side of each channel groove there are provided spiral grooves $SG_1$ and $SG_2$, as indicated, also extending 200° with their ends spaced the same distance as the spaced ports but with the ports displaced from the planes of grooves $G_1$ and $G_2$ a distance whereby the piston closes the pump ports P1 and P2 in the neutral position N of the reversing valve. Grooves $G_1$ and $SG_1$ may intersect because neither is connected to a port when the other is.

A further axial groove $G_3$ on the pump port side of the piston has its ends preferably out of communication with the other grooves but opening between them to place the pump ports P1 and P2 in communication with each other when the valve piston VP is in neutral position N and also blocks any flow through ports $G_1$ and $G_2$. Thus, with the deceleration of the winch at the top of the hoist by the rheostat RR, as later described, the application of the brake B can occur just as the flow through the bypass groove $G_3$ (FIG. 5) finally accommodates the complete hydraulic pump output through port $P_1$. This reversing means is relied upon for positively and selectively determining the raising or lowering mode of the winch motor M that is rotatively coupled with the hoist winch 44. In its neutral center-off position N there comparatively is no longer a higher pressure in the conduit PC except when the winch supports a load without the application of the winch brake.

Thereby, in position H to hoist the bucket 16, the prime mover PM powers the pump P through the reversing control FR to drive the hydraulic motor M for hoisting the bucket and this places one of the higher pressures (2,000 p.s.i. or more) in the conduit portion PC. In position L to lower the bucket the flow-direction reversing means FR reverses the flow-direction in conduits PC and RC, the weight of the bucket 16 reversely rotates the motor M and drives the hydraulic fluid in the reverse direction as indicated by arrows L, and this places the other higher pressure (1,200 p.s.i.) also in the conduit portion PC.

Accordingly, in both instances, the higher hydraulic pressures when present are always confined to the one leg PC of the circuit C as well as the pressure 900 p.s.i. which occurs when the bucket enters the water. In the neutral position N the reversing control recirculates hydraulic fluid in the pump while the circulation of hydraulic fluid in the circuit C is blocked thereby locking the winch motor M against rotation. This condition supports the bucket at a fixed height with resulting higher pressure in the PC of circuit C holding the winch motor M against rotating. With the control FR in neutral, any higher pressure can be relieved by applying the winch brake B.

A bypass conduit BP interconnecting circuit legs PC and RC bypasses the valve RV and has in it a spring-pressed check valve CV closing to prevent flow from circuit RC to circuit PC when vent valve VV is open in the lowering mode, but opens to prevent dangerous pressures occurring in conduit leg PC as when the bucket is unable to be hoisted at a safe hydraulic pressure.

A bypass conduit BC interconnects the two conduit legs PC and RC in an orientation that is parallel to the pump P and to the motor M and it includes a pressure relief valve RV which opens to vent pressure in the conduit RC to PC at a pressure differential between the conduits determined by the spring closing tension adjusted by setting the adjustable screw ST as more particularly explained hereinafter.

The brake B is controlled by the applicator BA which has a spring S to apply the brake B and a pressurizable cylinder CY which receives hydraulic fluid to overcome the spring S and release the brake B. A standing source of pressure is provided by the tank PT having an inert gas in it compressed by hydraulic fluid supplied from conduit PC as accumulated and trapped by the check valve TV at the maximum pressure exerted in conduit PC when the bucket with its load is being hoisted. The energization of the electromagnet EM moves the spool valve SV to its alternate position applying pressure from the tank PT to the cylinder CY thereby releasing the brake B. The de-energization of the electromagnet EM is also accomplished by the opening of limit switch LSL1, as later explained, to apply the brake at the luffing position of the bucket.

Coacting with and cooperating in the operation of the arrangement described is a worm drive WD rotated by the winch W. It axially displaces two cam followers C1 and C2 to actuate the cam switches LCS and UCS alternately, and sequential switches LSL 1 and 2. Cam switch LCS2 is closed to power the underwater controls just after the bucket B enters the water where the pressure drops to said 900 p.s.i. Switch LCS1 is closed for out-of-water operations and when the upper cam switch UCS is actuated as the bucket nears the upper hoist limit the luffing control is made ready. Sequential switches LSL1 and 2 terminally slow down and stop the hoisting for application of the brake B during the luffing and opening of the grab.

By way of illustrating the sequence of steps performed, the cycle of the grab operation is indicated in FIG. 7 in which arrows indicate the grab 16 movement and the sequence desired and starting with the grab open and luffed out for lowering, the lowering solenoid L is energized by closing the lowering switch LS manually or automatically. Switch LS also energizes relay LSR to close its self-holding switch LSR2 through normally closed switch DR2, connection 61 and 62, to provide the bucket lowering mode with switch LSR1 closed and switch LSR3 open. The brake B is released by pressure in conduit HC, the reversing solenoid RS is energized by connection 62 to its lowering position and the grab is lowered. The pressure in circuit leg PC then reflects the weight of the grab. Then the worm drive WD closes the cam switch LCS2 right after the bucket enters the water, to supply power to the switch of the pressure sensor means PR. The sensor means is adjustable to respond to any selected hydraulic pressure rise in conduit RC controlled by the adjustment of relief check valve RV. When submerged, the effective weight of the grab is decreased on the hydraulic system.

In this relation, when the bottom is contacted by the bucket, its weight on the hoist line is instantly reduced, and the motor M rapidly stops because of its internal friction. Thereupon, the pressure in conduit PC, which was due to the motor M being restrained by the pump P, drops to the charging pressure of the system and the pressure in conduit RC, confronted with a slowing or stopped motor M, builds up pressure rapidly towards that pressure, assumed to be 800 p.s.i., which would be required to positively sustain the unreeling rotation of the motor. The prime mover PM itself does not stop rotation since the flow directing selector valve FR is still in the bucket lowering mode. Thus, sufficient overrun can be provided for the desired slack in the hoist line by a determined delay in the application of the brake.

As the lowering pressure rapidly drops in conduit PC, the pressure in conduit RC rapidly rises since the valves CV and RV are closed. Then when the pressure in conduit RC increases to the pressure for which relay PR is selectively set, a pressure substantially less than said 800 p.s.i., the switch PR closes, to energize DR and close switch DR1 and any further rise in pressure in conduit RC is vented by the adjustable relief valve RV to conduit PC.

With the stopping of the winch and the pressure in conduit PC going to "0", the spring in pressure relay PS opens the PS switch, deenergizing the electromagnet EM. When the electromagnet EM is deenergized by the opening of the pressure relay switch PS at low pressure the spool spring SS will urge the valve SV to its normal position shown in FIG. 4 venting the pressure cylinder CY to the reservoir R through the drain D. Thereupon, the spring S will apply the brake B, and, incidentally provide a hydraulically fail-safe arrangement regardless of bucket position.

The bucket is closed by relay DR switch 1 to dig to a depth permitted by the hoist line looseness after which the brake B is released as hoisting pressure begins followed by deactivation of the bottom sensor. When the bucket is raised to its upper position the brake is again applied and the loaded bucket is luffed to its dumping position. There the bucket is opened to discharge its load and is ready for a repeat of the cycle.

SUMMARY

When the pressure responsive switch PR closes, five operations occur, namely:

1. The digging relay DR is energized to close switch 1 to ready underwater operations, deenergizes above-water operative circuits by opening switch 2 and 3, deenergizes the self-holding lowering solenoid relay LSR to open switch LSR 2 and close switch LSR3 with switches LSL1 and 2 closed.

2. The pressure relief valve RV establishes a pressure for operating the pressure responsive switch PR in controlling the flow reversing means FR.

3. The resulting pressure drop in conduit PC registered by solenoid PS opens its switch and deenergizes the electromagnet EM to permit the spring SS to move the spool valve SV to vent the hydraulic pressure in the brake applicator BA whereupon the spring S thereof applies the brake B to the winch 44.

4. The closing of the switch DR1 also activates the bucket control BV and turns a hydraulic pump HP (FIG. 1) through the connection 58 to pressurize the bucket hose 33 and thereby powers bucket cylinder 32 (FIG. 1) to close the bucket.

5. The opening of switch DR2 opens the supporting circuit 61, later described, and deenergizes the solenoid L of the reversing control RS to release and permit the valve FR (FIG. 5) to move to neutral position N in which the hydraulic fluid is recycled through passage $G_3$ to the pump P without any pressure differential in the circuit C and leaving the winch brake B applied.

Accordingly, with the speed of the lowering bucket adjustably held constant for all depths the desired earth penetration at the bottom may be controlled with an automatically controlled continuing lowering after contact, or the speed of lowering, or both.

FIG. 3 is a simplified illustration to indicate several mechanical arrangements that provide mechanical advantages for electrical and hydraulic components and in which speed reduction is employed to drive the winch W with a hydraulic motor M so that tension changes on the hoist lines are immediately substantial and are reflected in the hydraulic circuit C to operate the pressure responsive relay PR and thereby attain both the desired earth penetration without burying the grab bucket 26 and provide a proper slack in the hoist line 30 to limit the digging depth of the grab bucket.

The time to complete a closing of the bucket is adjustably measured by the rapidly increasing pressure in the low pressure conduit RC by the digging relay DR. The slight overrun in the hoist line is taken up during the digging as adjustably controlled by the penetration delayed allowed by the pressure increase on the pressure relay switch PR so that the hoist line is quickly tightened and becomes weight bearing and the bucket will dig no deeper than desired. Automatically uniform repetitive results are accomplished with no delays. Thereby, constancy of grab bucket loading is assured.

When switch DR1 is closed for the digging time cycle, switch DR2 is open thereby deenergizing through line 61 the self-holding switch LSR2 for the relay LSR, thereby opening switch LSR1 and closing switch LSR3. Current through switch LSR3 fully energizes the solenoid H through closed cam switch LSL2 for full hoist speed.

At the end of the digging cycle, the digging relay DR is released, thereby opening its switch DR1 and again closing its switch DR2. Thereupon, (1) solenoid H of the reversing solenoid RS being energized through connections 80, 63 and 60 and rheostat RR, switch LSL1 to pressure cylinder CY and release the brake B; energization of the electromagnet EM is through connections 63 and 64, switch LSL1, both circuits being connected through connection 61 to switch DR2; (2) check valve RV being closed enables the application of hydraulic pressure for the hoisting mode; and, (3) the brake electromagnet EM is also energized from connections 63 and 61 through switch LSL1 to release the brake B at the same time that the hoisting solenoid H of the reversing solenoid RS is energized. Thereafter, the reversing solenoid RS moves the flow reversing valve FR progressively from its neutral position N as the brake is released to the hoist position H to provide a gradual increasing flow of hydraulic fluid, and the motor M smoothly picks up the bucket and its load.

As the winch makes its first few turns the cam C1 releases the lower cam switch LCS for it to open its contacts 2 and close its contact 1 as shown in FIG. 4.

As the bucket moves upwardly with the switches DR2 and LCS1 closed the further control of the bucket is transferred to the luff control LO through connections 65 and 78 since the upper control switch UCS is closed as the bucket approaches its upper hoist limit D. The switches LCS1 and UCS serve essentially to assure that the bucket is at a luffing level before any luffing procedure is powered and triggered.

With the now closed switch LCS 1 and the closing of the UCS switch by worm movement of the cam C1, the luffing mode is made ready and the rapid hoist and the pressurizing of the brake applicator BA is being maintained through closed switches LSL1 and LSL2, respectively, including parallel connections 80 and 60 for switch LSL2, and connections 60, 63 and the rheostat RR for switch LSL1.

The cam-operated upper limit switch LSL comprises a pair of switches LSL1 and LSL2 which may be micro switches that are opened sequentially by an inclined cam C2 (FIG. 6) carried on the worm drive WD. The switch LSL2 is the first to open and switch LSL1 is the last to open in the hoist mode.

Then when switch LSL2 is opened by cam C2 the flow of electrical current to the hoist solenoid H is restricted to the rheostat RR which is adjustable to deenergize the hoist solenoid H progressively and permit it to gradually move to the neutral position N and thereby gradually restrain hydraulic flow to provide a slow-down and a terminal creep that ultimately opens switch LSL1. Thereupon, the brake solenoid BS connected to connection 63 is deenergized and the brake B is applied to the winch 44. During the hoisting operation the pressure tank PT has its pressure replenished for the next lowering and digging modes.

Thereafter, the luff control LO takes over to actuate the luffing cylinders 21, releases the bucket cylinder 32 to permit the bucket 16 to open, and then return the shear 12 to the bucket lowering position at the terminus of which a contact switch LS is closed in the luffing control that is in circuit with the connection 61 to energize the lowering switch relay LSR and close switches LSR 1 and 2 and open switch LSR3. Closing the switch LSR1 energizes the brake electromagnet EM through connection 64 to release the brake B while closing of switch LSR2 energizes the solenoid L of the reversing solenoid RS and provides a holding circuit through connection 73 between connection 61 and connection 62 which energizes the lowering solenoid L for the lowering mode. The opening of switch LSR3 isolates switches LSL1 and 2 from connection 61. Then when the DR switch 2 is opened the holding circuit 73 is released thereby releasing the relay LSR which in turn releases the reversing solenoid RS, returns it to its neutral position N and applies the brake B for the digging operation under the control of relay switch DR1 as already described. Opening switch LSR3 cuts out any energizaion related to the hoisting mode.

In order to assure release of the brake B regardless of the pressures in the conduit C, the high pressure in the tank PT is utilized as already described to release the brake B in a relation strictly timed with respect to the reversing solenoid RS.

It may be noted that without the source of pressure in the pressure tank PT being present and the flow reverser FR in neutral position N with the brake B applied, the pressure in conduits PC and RC may equalize since the weight of the bucket is carried by the brake B. Under this condition the pressure switch PS may be operating to deenergize the electromagnet EM until the flow reverser FR moves from its neutral position N to either its lowering position L or hoist position N. Or, the hydraulic flow stoppage of the flow reversing valve FR in neutral position N might carry the weight of the loaded bucket 16 during the luffing operation without the brake B. However, it is preferred to control the application of the brake B by the separate circuit controls as described for a fail safe in event of a power failure. In any event, until the brake B is applied the weight of the bucket 16 and its load could be carried by the pressure in the conduit portion PC when the flow reverser FR is in neutral position N.

Although interlocking circuit isolating switches or relays, including automatic safety relays AR1 and AR2, can be employed to deenergize circuits when not employed during a portion of the full cycle of operation, it is preferred to segregate the lowering-digging circuit from the hoisting-luffing-opening controls by the utilization of the additional upper limit cam switch C2 and switches LSL and LSR 1 and 2 for separately applying the brake B and returning the flow reverser FR to neutral position N. Accordingly, the cam switches UCS and LCS preferably do not overlap in their closing although one may set up the back contacts of the other as shown for a certain stepped relationship as described.

Furthermore, since the operation of the bottom-sensing-digging portion of the hydraulic circuit illustrated is semi-isolated from the remainder of the circuit, it still will be operative to perform automatically when called upon to do so even though the main control MC is set for manual operation. It is arranged to perform as a unit and can also be actuated manually only after the bucket enters the water, the manual switch MS being connected in parallel with the cammed limit switch LCS2 for this purpose. The brake control circuit preferably is automatic at all times when the pressure switch PS is deenergized intentionally or otherwise in a fail-safe relation, the brake being applied whenever adequate bucket support pressure is absent in the pressure conduit PC as when there is either failure of electrical power or a diesel breakdown. This is accompanied automatically with the mechanical application of the brake B. Moreover, the digging relay DR is controlled solely through the bottom-sensing relay PR in direct relation with the digging relay DR and vent solenoid VS since it is undesirable for the bucket to dig-bury itself when not restrained at a fixed level by the winch brake B. Even upon power failure or emergency cut-off in any mode or operation or when the pressure switch PS is opened for any reason, the spring SS engaging the spool valve SV will enable the application of the winch brake B and will actuate the flow reversing means FR for a standby neutral position N.

What is claimed is:

1. In a grab crane having a power driven hydraulic positive displacement pump and a hoist means driven by a hydraulic positive displacement motor for raising and lowering the grab of the grab crane;

conduit means including parallel high pressure conduit and low pressure conduit interconnecting said pump and motor in series flow relationship;

means for detecting a change of grab weight on the hoist means when the lowering grab contacts submerged work material including pressure responsive means critically responsive to a substantial increase of hydraulic pressure in the low pressure conduit from that pressure that is induced therein by the effective weight thereon of the grab being lowered empty under gravity through water at a controlled rate;

means actuated by said increase in hydraulic pressure for closing said grab in timed relation to said change in hydraulic pressure; and means actuated by said detecting means for changing the pattern of hydraulic flow in the conduits between the motor and pump.

2. The grab crane defined in claim 1 in which said detecting means is critically responsive to an increase of pressure in the portion of the conduit means conducting hydraulic fluid from the motor to the pump.

3. The grab crane defined in claim 1 including control means actuated by said detecting means for closing said grab in timed delay relation to said detection of substantial change in hydraulic pressure.

4. The crane defined in claim 1 including a normally closed vent valve opening a bypass conduit between said high and low pressure conduits to limit the pressure differential between the conduits when the pressure in the low pressure conduit exceeds that in the high pressure conduit.

5. The crane defined in claim 1 including check valve means interconnecting said high and low pressure conduits to limit the maximum pressure differential between the conduits.

6. In the crane defined in claim 3 in which said actuated control means includes a solenoid valve reversing the direction of hydraulic flow in said hydraulic motor during said timed relation.

7. The crane defined in claim 2 including means responsive to said change of pressure for braking said hoist means.

8. In a crane providing hoisting and lowering energy pressure differentials between high and low pressure conduits connected in series relation between a hydraulic pump and a hydraulic winch motor and having a grab raised and lowered by a hoist means subjected to said pressure differentials and brake means holding the hoist means against rotation when there is a loss of pressure in the high pressure conduit and a rise of pressure in the low pressure conduit; the combination of means detecting a rise in the pressure in the low pressure conduit in the lowering mode incurred by the initial contact of the grab with work material;

means for limiting the pressure rise in the low pressure conduit below that required to rotate the winch motor;

time delay means actuated by said detecting means permitting controlled grab penetration of the work material after said initial contact therewith;

means actuated at the termination of the penetration period of time for braking said hoist means against rotation to support said grab;

means for closing said grab; and digging relay switch means activated by said pressure detecting means for actuating the grab closing means during the activation of said brake means for limiting the digging depth of the closing grab.

9. A crane as defined in claim 8 including means for terminating said lowering differential pressure to activate the application of said brake means during said time delay means actuation by said detecting means and including means gradually reversing the direction and flow of hydraulic fluid in said conduits following actuation of said time delay means.

10. In a crane having a hydraulically operated hoist means for lowering an open grab including a hydraulic pump and a positive displacement hydraulic motor for raising and lowering the crane grab;

conduit means including a high pressure conduit and a low pressure conduit interconnecting said motor and pump in series flow relation;

pressure relief valve means interconnecting said conduits opening in the direction of venting from the low pressure conduit to the high pressure conduit and having means for varying the pressure at which said valve will open;

means including a brake for the hoist means responsive to a predetermined lowered pressure in the high pressure conduit for braking the hoist means; and means responsive to a substantial increase in hydraulic pressure in the low pressure conduit for controlling the hydraulic flow in the conduits.

11. The crane defined in claim 10 including valve means for reversing the direction of flow of hydraulic fluid in the conduits and motor in timed relation with the reclosure of said pressure relief valve means.

* * * * *